No. 763,233. Patented June 21, 1904.

UNITED STATES PATENT OFFICE.

HEINRICH WELTZ, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

ANTHRACENE DYE AND PROCESS OF MAKING SAME.

SPECIFICATION forming part of Letters Patent No. 763,233, dated June 21, 1904.

Application filed March 29, 1904. Serial No. 200,601. (No specimens.)

*To all whom it may concern:*

Be it known that I, HEINRICH WELTZ, a subject of the King of Bavaria, residing at Ludwigshafen-on-the-Rhine, in the Kingdom of Bavaria, Empire of Germany, have invented new and useful Improvements in Anthracene Coloring-Matter, of which the following is a specification.

I have discovered that the polyhydroxy-anthraquinone sulfo-acid described in the specification of application for United States Letters Patent Serial No. 152,069, of April 10, 1903, which can be obtained by acting on anthraquinone-beta-mono-sulfo-acid with concentrated sulfuric acid, mercury, or mercuric salts, and nitrous acid in the presence of arsenic acid or phosphoric acid, can be condensed with ammonia, giving rise to a new amido-dihydroxy-anthraquinone sulfo-acid. The conditions under which this condensation can be carried out—for instance, the concentration of the ammonia and the temperature—may be considerably varied without departing from the nature of my invention. This new amido-dihydroxy-anthraquinone sulfoacid produces fuchsin shades on unmordanted wool, bluish-red shades on wool mordanted with alumina, and brown-violet shades on chrome-mordanted wool.

The following examples will serve to further illustrate the nature of my invention, which, however, is not limited to these examples. The parts are by weight.

Example 1: Heat together in an autoclave for several hours at a temperature of about one hundred and twenty degrees centigrade (120° C.) ten (10) parts of the sodium salt of the above-mentioned polyhydroxy-anthraquinone sulfo-acid and one hundred and nine (109) parts of ammonia solution, (containing about twenty-five (25) per cent. of $NH_3$.) From time to time dissolve test portions of the melt in sulfuric acid and add boric acid to the solution. The reaction is ended as soon as the resulting solution exhibits a strong yellow fluorescence. The speed of the reaction depends on the temperature, because the higher the temperature the sooner is the reaction finished, while with lower temperatures the reaction proceeds more slowly. When the above test is satisfied, pour the reaction mixture into water, boil for a short time in order to bring about solution, and add hydrochloric acid in slight excess. On cooling the aforesaid new amido-dihydroxy-anthraquinone sulfo-acid separates out as a dark-brown mass. Filter this off and wash with common salt solution and, if necessary, purify by redissolving and reprecipitation. The said new acid when dry is of a brown-violet color and is fairly easily soluble in cold water and very easily soluble in hot water, the solution being reddish violet and becoming violet on the addition of caustic soda and light red on the addition of sodium carbonate. It yields a reddish yellow solution in concentrated sulfuric acid. In alcohol and in cold anilin it is difficultly soluble; but it is easily soluble in hot anilin, the solution being blood-red.

Example 2: Boil together for several hours in a vessel provided with an inverted condenser ten (10) parts of the sodium salt of the above-mentioned polyhydroxy-anthraquinone sulfo-acid, one hundred (100) parts of water, and ninety-one (91) parts of ammonia solution, (containing about twenty-five (25) per cent. of $NH_3$.) The reaction is finished when a small portion of the mixture satisfies the test mentioned in Example 1, and then the reaction mixture is worked up in the manner described in Example 1.

I claim—

1. The process of manufacturing anthracene coloring-matter by condensing the hereinbefore-mentioned polyhydroxy-anthraquinone sulfo-acid with ammonia.

2. The new coloring-matter such as can be obtained by condensing together the hereinbefore-mentioned polyhydroxy-anthraquinone sulfo-acid and ammonia, which dissolves in hot water with a reddish-violet color, which color on the addition of caustic soda becomes violet and on the addition of sodium carbonate becomes light red, whose solution in concentrated sulfuric acid is reddish yellow, and which dissolves in hot anilin yielding a blood-red solution.

In testimony whereof I have hereunto set my hand in the presence of two subscribing witnesses.

HEINRICH WELTZ.

Witnesses:
  H. W. HARRIS,
  S. ALEC LLOYD.